United States Patent
Lee et al.

(10) Patent No.: US 8,310,623 B2
(45) Date of Patent: Nov. 13, 2012

(54) OPTICAL SHEET AND LIQUID CRYSTAL DISPLAY INCLUDING THE SAME

(75) Inventors: Junghoon Lee, Cheongju (KR); Kyongrae Kim, Cheongju (KR)

(73) Assignee: LG Electronics Inc., Seoul (KR)

( * ) Notice: Subject to any disclaimer, the term of this patent is extended or adjusted under 35 U.S.C. 154(b) by 591 days.

(21) Appl. No.: 12/324,738

(22) Filed: Nov. 26, 2008

(65) Prior Publication Data
US 2009/0296028 A1    Dec. 3, 2009

(30) Foreign Application Priority Data

May 27, 2008  (KR) .................. 10-2008-0048919
Aug. 18, 2008  (KR) .................. 10-2008-0080417

(51) Int. Cl.
*G02F 1/1335*  (2006.01)
*G02B 5/30*  (2006.01)

(52) U.S. Cl. .. 349/64; 349/96; 359/485.03; 359/485.04; 359/488.01

(58) Field of Classification Search .......... 349/64, 349/96; 359/485.03, 485.04, 488.01
See application file for complete search history.

(56) References Cited

U.S. PATENT DOCUMENTS

| | | | |
|---|---|---|---|
| 5,882,774 A | 3/1999 | Jonza et al. | |
| 6,111,699 A | 8/2000 | Iwata et al. | |
| 6,144,491 A | 11/2000 | Orikasa et al. | |
| 6,196,692 B1 | 3/2001 | Umemoto et al. | |
| 6,208,466 B1 | 3/2001 | Liu et al. | |
| 6,268,961 B1* | 7/2001 | Nevitt et al. | 359/485.03 |
| 6,809,782 B1* | 10/2004 | Kawamoto et al. | 349/96 |
| 6,952,310 B1 | 10/2005 | Miyatake et al. | |
| 7,317,498 B2 | 1/2008 | Hara et al. | |
| 2004/0114248 A1* | 6/2004 | Hokazono et al. | 359/603 |
| 2005/0162743 A1 | 7/2005 | Yano et al. | |
| 2006/0147676 A1 | 7/2006 | Yoshida | |
| 2006/0291055 A1 | 12/2006 | Gehlsen et al. | |
| 2007/0134438 A1 | 6/2007 | Fabick et al. | |
| 2007/0190291 A1 | 8/2007 | Kitahara et al. | |
| 2007/0253064 A1 | 11/2007 | Ookubo et al. | |
| 2008/0002256 A1 | 1/2008 | Sasagawa et al. | |
| 2008/0049419 A1* | 2/2008 | Ma et al. | 362/225 |
| 2008/0167742 A1 | 7/2008 | Endo et al. | |
| 2009/0161221 A1 | 6/2009 | Yang et al. | |
| 2009/0296028 A1 | 12/2009 | Lee et al. | |
| 2009/0303589 A1 | 12/2009 | Lee et al. | |

FOREIGN PATENT DOCUMENTS

CN        1375066 A       10/2002
(Continued)

*Primary Examiner* — Michael Caley
(74) *Attorney, Agent, or Firm* — Birch, Stewart, Kolasch & Birch, LLP

(57) ABSTRACT

An optical sheet and a liquid crystal display including the same are disclosed. The optical sheet includes a reflective polarizing film, a first adhesive layer on one surface of the reflective polarizing film, and a first diffusion layer on the first adhesive layer. The first adhesive layer has first and second thicknesses. The first diffusion layer includes a first light transmitting material and a plurality of first diffusion particles. At least one of the first diffusion particles has a portion protruding above a surface of the first light transmitting material, and a height of the portion, h1, substantially satisfies the following equation: $0.1D1 \leq h1 \leq 0.7D1$, where D1 is a diameter of the at least one of the first diffusion particles. The first thickness, T1, and the second thickness, T2, substantially satisfy the following equation: $10 \text{ nm} \leq |T1-T2| \leq 2 \text{ μm}$.

18 Claims, 5 Drawing Sheets

FOREIGN PATENT DOCUMENTS

| | | |
|---|---|---|
| CN | 1135409 C | 1/2004 |
| CN | 1174266 C | 11/2004 |
| CN | 1646947 A | 7/2005 |
| CN | 101124495 A | 2/2008 |
| EP | 0 677 768 A1 | 10/1995 |
| EP | 1 391 758 A2 | 2/2004 |
| EP | 1 852 719 A1 | 11/2007 |
| EP | 1 873 579 A1 | 1/2008 |
| JP | 2001-74919 A | 3/2001 |
| JP | 2005-265864 A | 9/2005 |
| JP | 2006-259257 A | 9/2006 |
| KR | 10-2006-0080888 A | 11/2006 |
| KR | 10-2007-0071346 A | 7/2007 |
| KR | 10-2007-0114965 A | 12/2007 |
| TW | 388802 B | 5/2000 |
| TW | 409196 B | 10/2000 |
| TW | 200817780 A | 4/2008 |
| WO | WO-01-22130 A1 | 3/2001 |
| WO | WO 01/22130 A1 | 3/2001 |
| WO | WO-03/034134 A2 | 4/2003 |
| WO | WO-2006/044475 A2 | 4/2006 |
| WO | WO 2008/005760 A1 | 1/2008 |
| WO | WO-2008/047593 A1 | 4/2008 |

* cited by examiner

OPTICAL SHEET AND LIQUID CRYSTAL DISPLAY INCLUDING THE SAME

This application claims the benefit of Korean Patent Application No. 10-2008-0048919 filed on May 27, 2008 and No. 10-2008-0080417 filed on Aug. 18, 2008, the entire contents of which is hereby incorporated by reference.

BACKGROUND

1. Field of the Invention

Exemplary embodiment of the invention relate to an optical sheet and a liquid crystal display including the same.

2. Description of the Related Art

Recently, the types of display fields capable of visually displaying information of various electrical signals have rapidly grown. With this growth, various kinds of flat panel displays having excellent characteristics such as thin profile, lightness in weight, and low power consumption have been introduced. Accordingly, conventional cathode ray tubes (CRT) are being rapidly replaced by the flat panel displays.

Examples of these flat panel displays are those that include a liquid crystal display (LCD), a plasma display panel (PDP), a field emission display (FED), and an electroluminescence display (ELD). The liquid crystal display has been actively used as display panels of notebooks, monitors of personal computers, TV monitors because of a high contrast ratio and excellent display characteristics of a moving picture.

The liquid crystal display may be generally classified as a light receiving display. The liquid crystal display includes a liquid crystal display panel displaying an image and a backlight unit that is positioned under the liquid crystal display panel to provide the liquid crystal display panel with light.

The backlight unit includes a light source and an optical sheet. The optical sheet typically includes a diffusion sheet, a prism sheet, or a protective sheet.

If the uniformity of a luminance of light which the backlight unit provides to the liquid crystal display panel is reduced, the display quality of the liquid crystal display is reduced. In the related art, the diffusion sheet attempts to uniformly diffuse the light over the entire surface of a display area of the liquid crystal display panel so as to prevent a reduction in the luminance uniformity of the light. However, it is difficult to secure a high light diffusivity as well as the luminance uniformity using only the diffusion sheet.

SUMMARY OF THE INVENTION

Exemplary embodiments of the invention provide an optical sheet capable of improving optical characteristics and a liquid crystal display including the optical sheet capable of improving the display quality.

Additional features and advantages of the exemplary embodiments of the invention will be set forth in the description which follows, and in part will be apparent from the description, or may be learned by practice of the exemplary embodiments of the invention. The objectives and other advantages of the exemplary embodiments of the invention will be realized and attained by the structure particularly pointed out in the written description and claims hereof as well as the appended drawings.

In one aspect, there is an optical sheet including a reflective polarizing film, a first adhesive layer on one surface of the reflective polarizing film, the first adhesive layer having a first thickness and a second thickness, and a first diffusion layer on the first adhesive layer, the first diffusion layer including a first light transmitting material and a plurality of first diffusion particle, wherein at least one of the plurality of first diffusion particles has a portion protruding above a surface of the first light transmitting material, and a height of the portion, h1, substantially satisfies the following equation: $0.1D1 \leq h1 \leq 0.7D1$, where D1 is a diameter of the at least one of the plurality of first diffusion particles, wherein the first thickness, T1, and the second thickness, T2, substantially satisfy the following equation: $10\ \text{nm} \leq |T1-T2| \leq 2\ \mu\text{m}$.

In another aspect, there is a liquid crystal display including a light source, an optical sheet on the light source, and a liquid crystal display panel on the optical sheet, wherein the optical sheet includes a reflective polarizing film, a first adhesive layer on one surface of the reflective polarizing film, the first adhesive layer having a first thickness and a second thickness, and a first diffusion layer on the first adhesive layer, the first diffusion layer including a first light transmitting material and a plurality of first diffusion particles, wherein at least one of the plurality of first diffusion particles has a portion protruding above a surface of the first light transmitting material, and a height of the portion, h1, substantially satisfies the following equation: $0.1D1 \leq h1 \leq 0.7D1$, where D1 is a diameter of the at least one of the plurality of first diffusion particles, wherein the first thickness, T1, and the second thickness, T2, substantially satisfy the following equation: $10\ \text{nm} \leq |T1-T2| \leq 2\ \mu\text{m}$.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Figure 1:
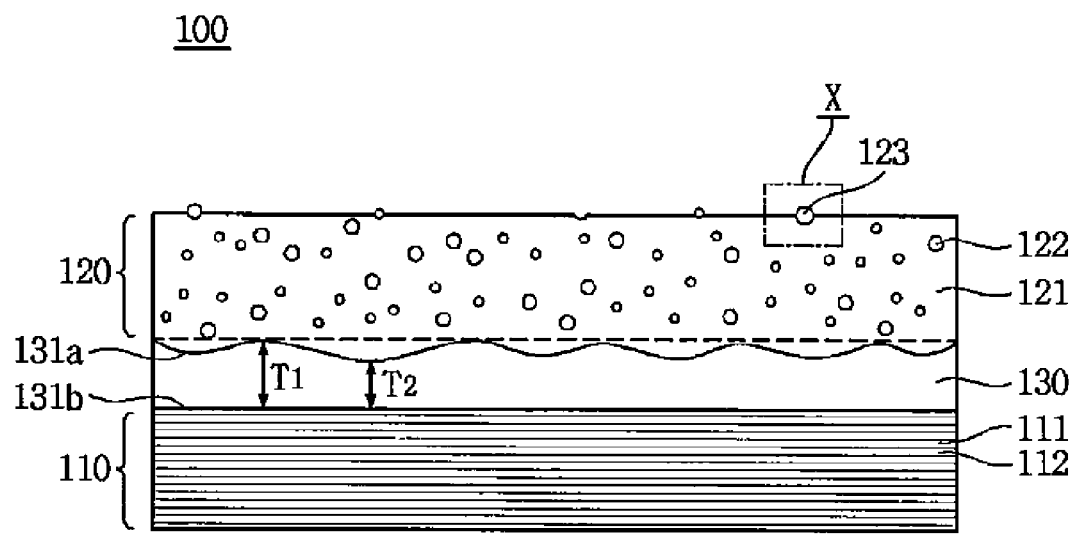
FIG. 1 is a cross-section view of an optical sheet according to an exemplary embodiment of the invention.
Figure 2:
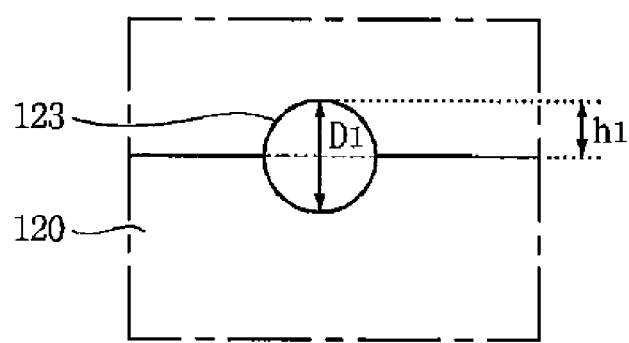
FIG. 2 is an enlarged view of an area X shown in FIG. 1.

FIG. 1 is a cross-section view of an optical sheet 100 according to an exemplary embodiment of the invention, and FIG. 2 is an enlarged view of an area X shown in FIG. 1.

As shown in FIG. 1, the optical sheet 100 may include a reflective polarizing film 110 and a first diffusion layer 120 on the reflective polarizing film 110. The first diffusion layer 120 may include a first light transmitting material 121 and a plurality of first diffusion particles 122 and 123. Some first diffusion particles 122 may be embedded into the light transmitting material 121. Additionally, some first diffusion particles 123 may be exposed outside the light transmitting material 121.

The reflective polarizing film 110 can transmit or reflect light coming from a light source. The reflective polarizing film 110 may include a first layer 111 formed of a polymer and a second layer 112 positioned adjacent to the first layer 111. The second layer 112 may be formed of a polymer having a refractive index different from a refractive index of the polymer forming the first layer 111.

The reflective polarizing film 110 may have a structure in which the first layers 111 and the second layers 112 are alternately stacked repeatedly. The first layer 111 may be formed of polymethylmethacrylate (PMMA), and the second layers 112 may be formed polyester.

A portion of the light coming from the light source is transmitted by the reflective polarizing film 110, and another portion of the light coming from the light source is reflected toward the light source underlying the reflective polarizing film 110. The light reflected toward the light source is again reflected and is incident on the reflective polarizing film 110. A portion of the light incident on the reflective polarizing film 110 is transmitted by the reflective polarizing film 110, and another portion of the light incident on the reflective polarizing film 110 is again reflected toward the light source underlying the reflective polarizing film 110.

In other words, because the reflective polarizing film 110 has the structure in which the first layers 111 and the second layers 112 are alternately stacked repeatedly, the reflective polarizing film 110 can improve the efficiency of the light coming from the light source using a principle in which molecules of the polymer are oriented in one direction to transmit a polarization of a direction different from the orientation direction of the molecules and to reflect a polarization of the same direction as the orientation direction of the molecules.

The reflective polarizing film 110 may have a thickness of 100 μm to 300 μm depending on the size of a display device. When the thickness of the reflective polarizing film 110 is equal to or larger than 100 μm, the efficiency of the light can be improved using the principle of the polarization and the reflection. When the thickness of the reflective polarizing film 110 is equal to or smaller than 300 μm, the thin profile optical sheet can be achieved.

The first diffusion layer 120 can diffuse the light coming from the external fight source through the first diffusion particles 122 and 123 in the first diffusion layer 120.

The first light transmitting material 121 forming the first diffusion layer 120 may use unsaturated polyester, methyl methacrylate, ethyl methacrylate, isobutyl methacrylate, normal butyl methacrylate, normal butyl methyl methacrylate, acrylic acid, methacrylic acid, hydroxyethyl methacrylate, hydroxypropyl methacrylate, hydroxyethyl acrylate, acrylamide, methylol acrylamide, glycidyl methacrylate, ethyl acrylate, isobutyl acrylate, normal butyl acrylate, acrylic-based material such as 2-ethylhexyl acrylate polymer, 2-ethylhexyl acrylate copolymer or 2-ethylhexyl acrylate terpolymer, urethane-based material, epoxy-based material, melamine-based material, polycarbonate, and polystyrene, but is not limited thereto.

Any of the first diffusion particles 122 and 123 in the first diffusion layer 120 may be a bead. Any one of the first diffusion particles 122 and 123 may be formed of a material selected from the group consisting one of polymethylmethacrylate (PMMA), polystyrene, silicon, and a combination thereof.

Diameters of the first diffusion particles 122 and 123 distributed in the first light transmitting material 121 may be non-uniform.

The first diffusion particles 122 and 123 may have a circle shape, an oval shape, a snowman shape, and an even circle shape, but are not limited thereto.

The first diffusion particles 122 and 123 may be non-uniformly distributed in the first light transmitting material 121.

Some of the first diffusion particles 122 may be formed in the first light transmitting material 121, and some of the first diffusion particles 123 may be exposed outside the first light transmitting material 121.

The diameters of the first diffusion particles 122 and 123 may be substantially 0.5 μm to 10 μm. When the diameters of the first diffusion particles 122 and 123 are small, a light diffusivity of the optical sheet 100 can be improved by increasing a density of the first diffusion particles 122 and 123 in the first diffusion layer 120. However, when the diameters of the first diffusion particles 122 and 123 are very small, the interference of the light coming from the external light source may occur. Therefore, when the diameters of the first diffusion particles 122 and 123 are equal to or larger than 0.5 μm, the light diffusivity of the optical sheet 100 can be maximally improved to the extent that the interference of the light does not occur.

When the diameters of the first diffusion particles 122 and 123 are large, the first diffusion layer 120 has to be thick so as to secure the light diffusivity of the optical sheet 100. Thus, it is difficult to manufacture a thin profile optical sheet 100 when the first diffusion particles 122 and 123 are large. Therefore, when the diameters of the first diffusion particles 122 and 123 are equal to or smaller than 10 μm, the thin profile of the optical sheet 100 can be achieved to the extent that the light diffusivity of the optical sheet 100 is not reduced.

Accordingly, a backlight unit including the optical sheet according to the exemplary embodiment of the invention is operated as follows.

Light produced by a light source is incident on the optical sheet. A portion of the light incident on the optical sheet collides with the first diffusion particles of the first diffusion layer, and a traveling path of the light changes. Another portion of the light incident on the optical sheet passes through an emitting surface of the first diffusion layer to travel toward a liquid crystal display panel.

The light colliding with the first diffusion particles collides with collides with another first diffusion particles adjacent to the colliding first diffusion particles, and a traveling path of the light changes again. A portion of the light, of which the traveling path changes twice, passes through the emitting surface of the first diffusion layer to travel toward the liquid crystal display panel. Another portion of the light, of which the traveling path changes twice, collides with the first diffusion particles, and a traveling path of the light changes.

Finally, the light passing through the emitting surface of the first diffusion layer is uniformly incident on the liquid crystal display panel.

The optical sheet 100 according to the exemplary embodiment of the invention may further include a first adhesive layer 130 between the reflective polarizing film 110 and the first diffusion layer 120.

The first diffusion layer 120 may be formed on the reflective polarizing film 110 by mixing the first light transmitting material 121 with the first diffusion particles 122 and 123 and applying or coating the mixture on the reflective polarizing film 11.

Otherwise, the first diffusion layer 120 may be formed on the reflective polarizing film 110 by forming the first light transmitting material 121 and the first diffusion particles 122 and 123 in a film form using an extrusion molding method or an injection molding method and then attaching it on the reflective polarizing film 110 using an adhesive. Sequentially, the first adhesive layer 130 may be coated on the reflective polarizing film 110 to form the first diffusion layer 120.

The first adhesive layer 130 may be formed of a material selected from the group consisting of an acrylic-based adhesive, a rubber-based adhesive, a silicon-based adhesive, and a combination thereof.

Examples of the acrylic-based adhesive include acrylic acid alkyl ester such as ethyl acrylate, butyl acrylate, amyl acrylate, 2-ethylhexyl acrylate, octyl acrylate, cyclohexyl acrylate and benzyl acrylate, and methacrylic acid alkyl ester such as butyl methacrylate, 2-ethylhexyl methacrylate, cyclohexyl methacrylate and benzyl methacrylate.

The rubber-based adhesive may include a block copolymer including natural rubber, isoprene rubber, styrene-butadiene rubber, reclaimed rubber, polyisobutylene rubber, styrene-isoprene-styrene rubber, and styrene-butadiene-styrene rubber as a principal component.

Examples of the silicon-based adhesive include dimethylsiloxane-based material and diphenylsiloxane-based material.

The first adhesive layer 130 may include a first surface 131a and a second surface 131b that are opposite to each other. At least one of the first surface 131a and the second surface 131b may have a curved surface.

A thickness of the first adhesive layer 130 may be substantially 1 μm to 10 μm in consideration of a light transmittance and an adhesive property, but is not limited thereto.

The thickness of the first adhesive layer 130 may mean an average value of a distance between a peak of the first surface 131a and the second surface 131b and a distance between a valley of the first surface 131a and the second surface 131b.

A vertical distance T1 between a first position of the first surface 131a and the second surface 131b may be different from a vertical distance T2 between a second position of the first surface 131a and the second surface 131b. The vertical distances T1 and T2 may satisfy the following equation: $10\text{ nm} \leq |T1-T2| \leq 2\text{ μm}$. As seen in FIG. 1, vertical distances T1 and T2 are distances along vectors substantially perpendicular to the surface plane of reflective polarizing film 110.

The following Table 1 indicates a diffusion effect and a luminance of the optical sheet 100 depending on a relationship between the vertical distances T1 and T2. In the following Table 1, X, ○, and □ indicate bad, good, and excellent performance characteristics, respectively.

TABLE 1

| $|T_1-T_2|$ (□) | Diffusion effect | Luminance |
| --- | --- | --- |
| 0.005 | X | □ |
| 0.01 | ○ | □ |
| 0.03 | ○ | □ |
| 0.05 | ○ | ○ |
| 0.1 | ○ | ○ |
| 0.5 | ○ | ○ |
| 1 | □ | ○ |
| 2 | □ | ○ |
| 5 | □ | X |

As indicated in the above Table 1, when the vertical distances T1 and T2 satisfy the following equation: $10\text{ nm} \leq |T1-T2|$, the light coming from the light source can be efficiently diffused because of curved surfaces on one surface of the first adhesive layer 130. When the vertical distances T1 and T2 satisfy the following equation: $|T1-T2| \leq 2\text{ μm}$, a reduction in the luminance resulting from a large height difference of the first adhesive layer 130 can be prevented.

As shown in FIG. 2, at least one of the plurality of first diffusion particles (for example, the first diffusion particle 123) may have a portion protruding above a surface of the first light transmitting material 121. A height h1 of the protruding portion may substantially satisfy the following equation: $0.1D1 \leq h1 \leq 0.7D1$, where D1 is a diameter of the at least one of the plurality of first diffusion particles.

The following Table 2 indicates a diffusivity and a detach state of the optical sheet 100 depending on the height h1 of the protruding portion. In the following Table 1, X, ○, and □ indicate bad, good, and excellent states of the characteristics, respectively.

TABLE 2

| Height h1 of protruding portion | Diffusivity | Detach state |
| --- | --- | --- |
| 0.0D1 | X | □ |
| 0.1D1 | ○ | □ |
| 0.2D1 | ○ | □ |
| 0.3D1 | □ | □ |
| 0.4D1 | □ | □ |
| 0.5D1 | □ | □ |
| 0.6D1 | □ | □ |
| 0.7D1 | □ | ○ |
| 0.8D1 | □ | X |
| 0.9D1 | □ | X |
| 1.0D1 | □ | X |

As indicated in the above Table 2, when the height h1 of the protruding portion is equal to or larger than 0.1D1, the diffusivity can be improved. When the height h1 of the protruding portion is equal to or smaller than 0.7D1, a problem in which the first diffusion particle 123 is easily detached from the first diffusion layer 120 can be prevented while the improved diffusivity is maintained.

Because the height h1 of the protruding portion of the first diffusion particle 123 is within the above range, damage to the optical sheet 100 caused by the overexposure of the first diffusion particle 123 from the surface of the first light transmitting material 121 during a manufacturing process can be prevented. Further, the quality and the reliability of the optical sheet 100 can be improved by preventing the damage of the optical sheet 100 using the first diffusion particle 123, and also the light efficiency of the backlight unit and the display quality and the reliability of the liquid crystal display can be improved.

Figure 3:
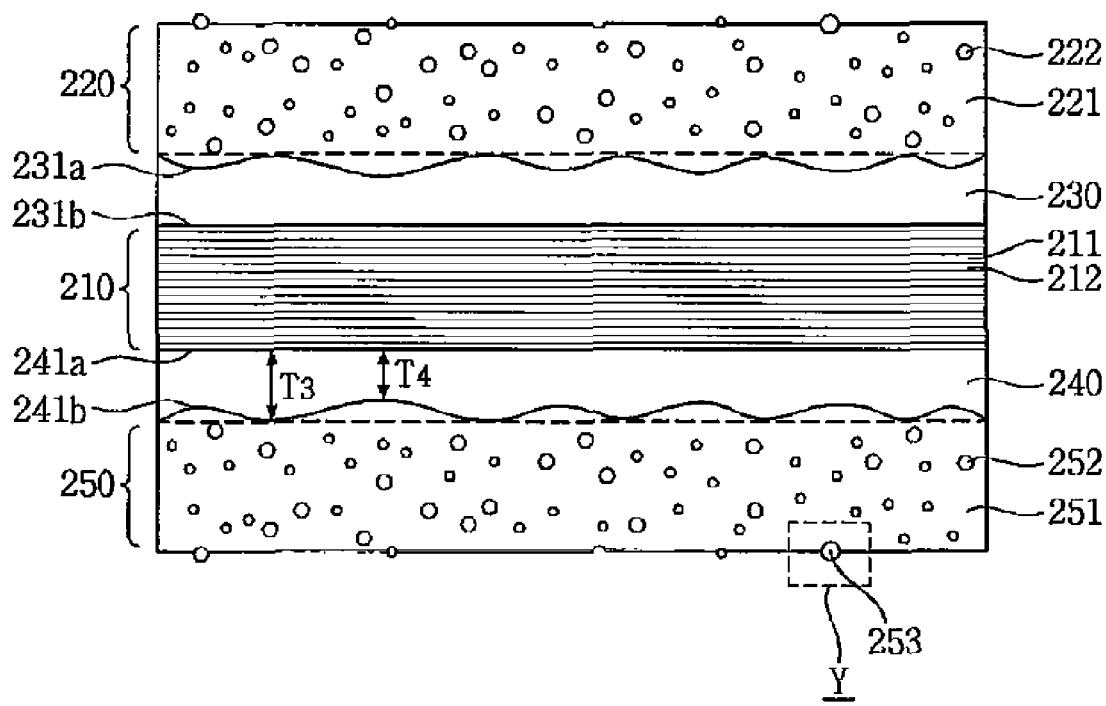
FIG. 3 is a cross-section view of an optical sheet according to another exemplary embodiment of the invention.
Figure 4:
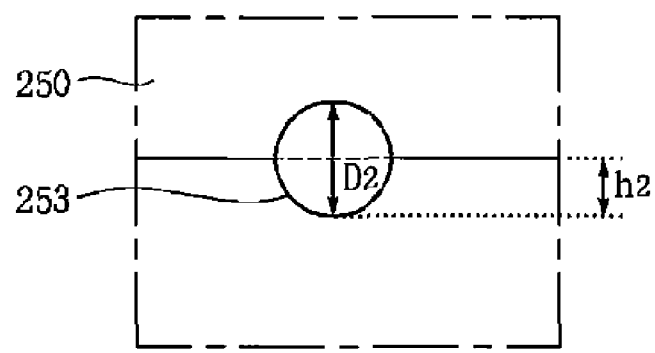
FIG. 4 is an enlarged view of an area Y shown in FIG. 3.

FIG. 3 is a cross-section view of an optical sheet 200 according to another exemplary embodiment of the invention, and FIG. 4 is an enlarged view of an area Y shown in FIG. 3.

As shown in FIGS. 3 and 4, the optical sheet 200 may include a reflective polarizing film 210, a first adhesive layer 230 on the reflective polarizing film 210, and a first diffusion layer 220 on the first adhesive layer 230. The first diffusion layer 220 may include a first light transmitting material 221 and a plurality of first diffusion particles 222. Some first diffusion particles 252 may be embedded into the first transmitting material 221. And some first diffusion particles 253 may be exposed outside the first transmitting material 221.

The optical sheet 200 may further include a second adhesive layer 240 under the reflective polarizing film 210 and a second diffusion layer 250 on the second adhesive layer 240.

Since the reflective polarizing film 210, the first diffusion layer 220, and the first adhesive layer 230 are described above with reference to FIGS. 1 and 2, a description thereof is omitted.

The second diffusion layer 250 may be the same as the first diffusion layer 220. The second diffusion layer 250 can diffuse the light coming from an external light source through a plurality of second diffusion particles 252 and 253 in a second light transmitting material 251 with a predetermined adhesive property.

The second light transmitting material 250 forming the second diffusion layer 250 may use unsaturated polyester, methyl methacrylate, ethyl methacrylate, isobutyl methacrylate, normal butyl methacrylate, normal butyl methyl methacrylate, acrylic acid, methacrylic acid, hydroxyethyl methacrylate, hydroxypropyl methacrylate, hydroxyethyl acrylate, acrylamide, methylol acrylamide, glycidyl methacrylate, ethyl acrylate, isobutyl acrylate, normal butyl acrylate, acrylic-based material such as 2-ethylhexyl acrylate polymer, 2-ethylhexyl acrylate copolymer or 2-ethylhexyl acrylate terpolymer, urethane-based material, epoxy-based material, melamine-based material, polycarbonate, and polystyrene, but is not limited thereto.

Any of the second diffusion particles 252 and 253 in the second diffusion layer 250 may be a bead. Either one of the second diffusion particles 252 and 253 may be formed of a material selected from the group consisting one of polymethylmethacrylate (PMMA), polystyrene, silicon, and a combination thereof.

Diameters of the second diffusion particles 252 and 253 distributed in the second light transmitting material 251 may be non-uniform.

The second diffusion particles 252 and 253 may have a circle shape, an oval shape, a snowman/peanut shape, and an even circle shape, but are not limited thereto.

The second diffusion particles 252 and 253 may be non-uniformly distributed in the second light transmitting material 251.

Some of the second diffusion particles 252 may be formed in the second light transmitting material 251, and some of the second diffusion particles 253 may be exposed outside the second light transmitting material 251.

The diameters of the second diffusion particles 252 and 253 may be substantially 0.5 μm to 10 μm. When the diameters of the second diffusion particles 252 and 253 are small (e.g., <3 μm), a light diffusivity of the optical sheet 200 can be improved by increasing a density of the second diffusion particles 252 and 253 in the second diffusion layer 250. However, when the diameters of the second diffusion particles 252 and 253 are very small (e.g., <0.5 μm), the interference of the light coming from the external light source may occur. Therefore, when the diameters of the second diffusion particles 252 and 253 are equal to or larger than 0.5 μm, the light diffusivity of the optical sheet 200 can be maximally improved to the extent that the interference of the light does not occur.

When the diameters of the second diffusion particles 252 and 253 are large (e.g., >10 μm), the second diffusion layer 250 has to be thickly formed so as to secure the light diffusivity of the optical sheet 200, and thus it is difficult to manufacture the thin profile optical sheet 200. Therefore, when the diameters of the second diffusion particles 252 and 253 are equal to or smaller than 10 μm, the thin profile of the optical sheet 100 can be achieved to the extent that the light diffusivity of the optical sheet 200 is not reduced.

The second adhesive layer 240 used to attach the reflective polarizing film 210 to the second diffusion layer 250 may be the same as the first adhesive layer 230.

The second adhesive layer 240 may be formed of a material selected from the group consisting of an acrylic-based adhesive, a rubber-based adhesive, a silicon-based adhesive and a combination thereof.

Examples of the acrylic-based adhesive include acrylic acid alkyl ester such as ethyl acrylate, butyl acrylate, amyl acrylate, 2-ethylhexyl acrylate, octyl acrylate, cyclohexyl acrylate and benzyl acrylate, and methacrylic acid alkyl ester such as butyl methacrylate, 2-ethylhexyl methacrylate, cyclohexyl methacrylate and benzyl methacrylate.

The rubber-based adhesive may include a block copolymer including natural rubber, isoprene rubber, styrene-butadiene rubber, reclaimed rubber, polyisobutylene rubber, styrene-isoprene-styrene rubber, and styrene-butadiene-styrene rubber as a principal component.

Examples of the silicon-based adhesive include dimethylsiloxane-based material and diphenylsiloxane-based material.

The second adhesive layer 240 may include a third surface 241a and a fourth surface 241b that are opposite to each other. At least one of the third surface 241a and the fourth surface 241b, for example, the fourth surface 241b may have a curved surface.

A thickness of the second adhesive layer 240 may be substantially 1 μm to 10 μm in consideration of a light transmittance and an adhesive property, but is not limited thereto.

The thickness of the second adhesive layer 240 may mean an average value of a distance between a peak of the fourth surface 241b and the third surface 241a and a distance between a valley of the fourth surface 241b and the third surface 241a.

A vertical distance T3 between a first position of the fourth surface 241b and the third surface 241a may be different from a vertical distance T4 between a second position of the fourth surface 241b and the third surface 241a. Similar to the first adhesive layer 230, the vertical distances T3 and T4 may satisfy the following equation: $10 \text{ nm} \leq |T3-T4| \leq 2 \text{ μm}$.

When the vertical distances T3 and T4 satisfy the following equation: $10 \text{ nm} \leq |T3-T4|$, the light coming from the light source can be efficiently diffused because of the curved surfaces on one surface of the second adhesive layer 240. When the vertical distances T3 and T4 satisfy the following equation: $|T3-T4| \leq 2 \text{ μm}$, a reduction in the luminance can be prevented because of a large height difference between the curved surfaces of the second adhesive layer 240.

As shown in FIG. 4, at least one of the plurality of second diffusion particles (for example, the second diffusion particle 253) may have a portion protruding above a surface of the second light transmitting material 251. A height h2 of the protruding portion may substantially satisfy the following equation: $0.1D2 \leq h2 \leq 0.7D2$, where D2 is a diameter of the at least one of the plurality of second diffusion particles.

When the height h2 of the protruding portion is equal to or larger than 0.1D2, the diffusivity can be improved. When the height h2 of the protruding portion is equal to or smaller than 0.7D2, a problem in which the second diffusion particle 253 is easily detached from the second diffusion layer 250 can be prevented while the improved diffusivity is maintained.

Figure 5A:
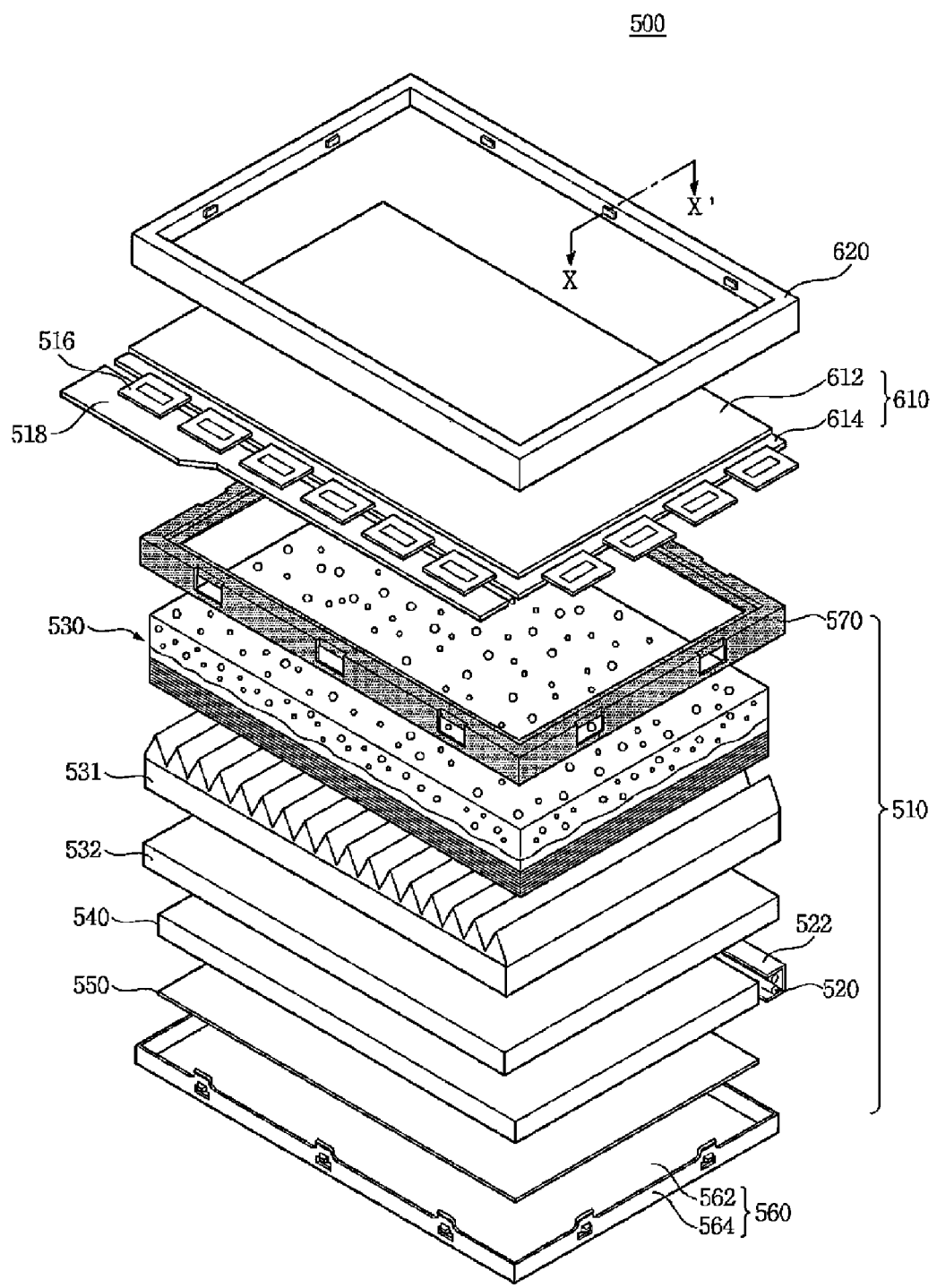
FIGS. 5A to 5C show a liquid crystal display according to an exemplary embodiment of the invention.
Figure 5B:
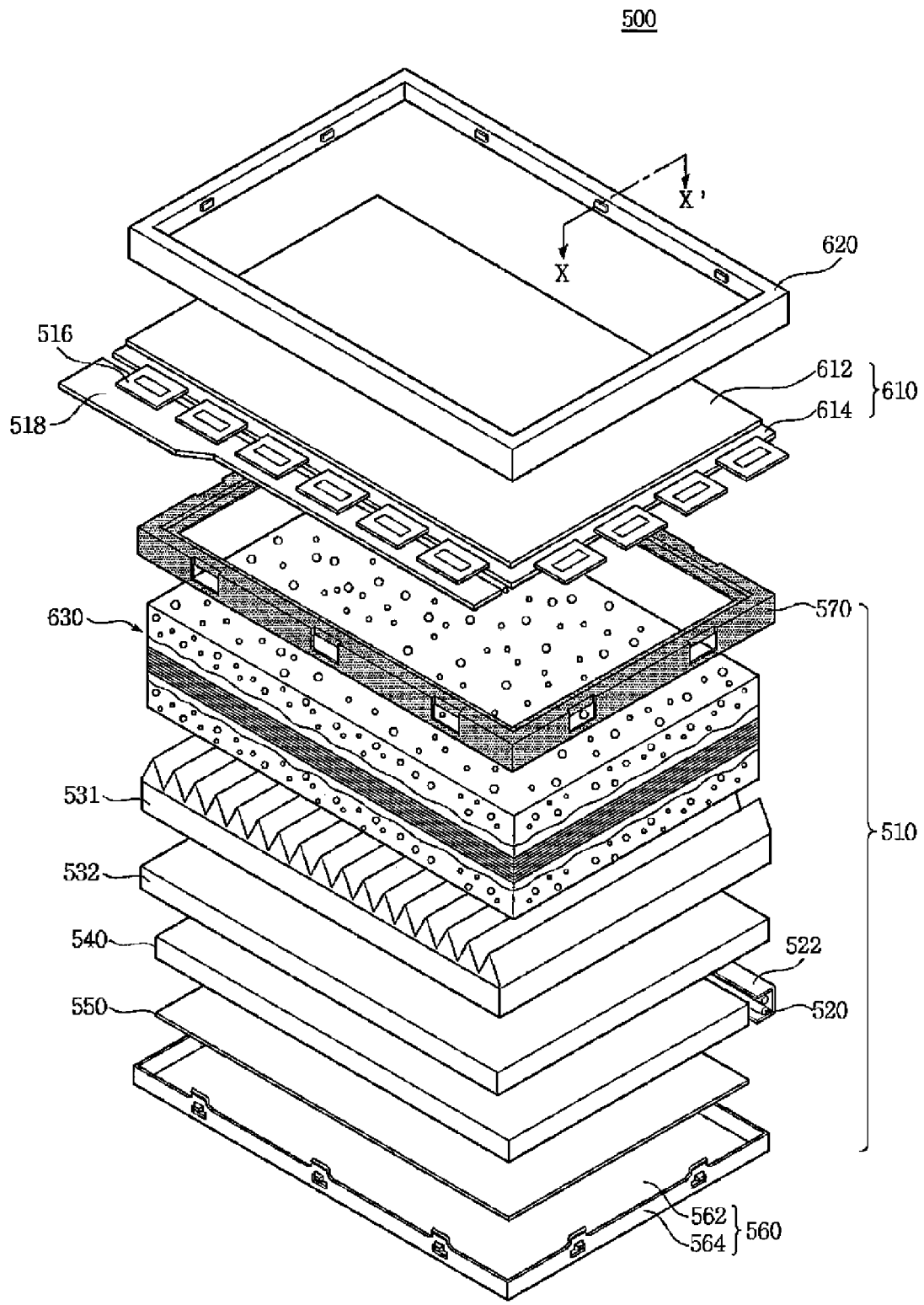
Figure 5C:
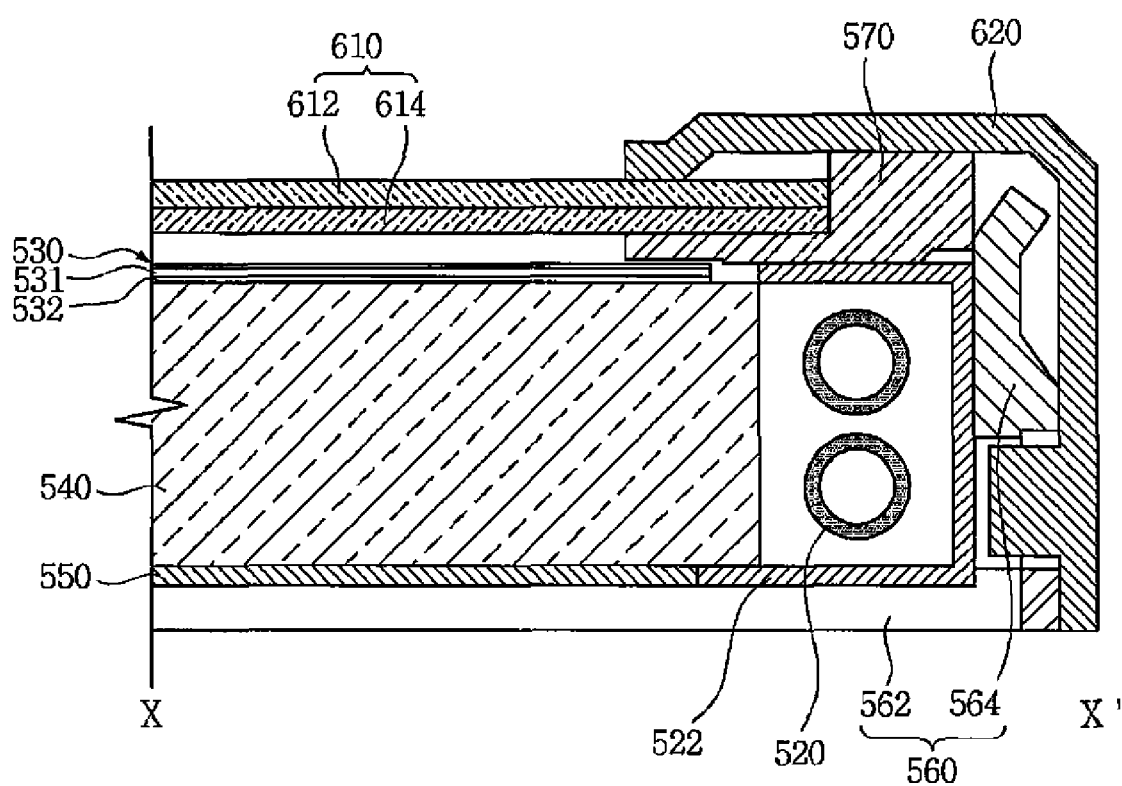

FIGS. 5A to 5C are an exploded perspective view and a cross-sectional view illustrating a configuration of a liquid crystal display 500 according to an exemplary embodiment of the invention. The liquid crystal display 500 shown in FIGS. 5A to 5C includes an edge type backlight unit, but is not limited thereto. For example, the liquid crystal display 500 may include a direct type backlight unit. As shown in FIGS. 5A to 5C, the liquid crystal display 500 can display an image using electro-optical characteristics of liquid crystals.

The liquid crystal display 500 may include a backlight unit 510 and a liquid crystal display panel 610.

The backlight unit 510 may be positioned under the liquid crystal display panel 610 and can provide the liquid crystal display panel 610 with light.

The backlight unit 510 may include a light source 520 and an optical sheet 530. The backlight unit 510 may further include a light guide plate 540, a reflector 550, a bottom cover 560, and a mold frame 570.

The light source 520 can produce light using a drive power received from the outside and emit the produced light.

At least one light source 520 may be positioned at one side of the light guide plate 540 along a long axis direction of the light guide plate 540. At least one light source 520 may be positioned at each of both sides of the light guide plate 540.

Light coming from the light source 520 may be directly incident on the light guide plate 540. Or, the light coming from the light source 520 may be reflected from a light source housing 522 surrounding a portion of the light source 520 (for example, about ¾ of an outer circumferential surface of the light source 520), and then may be incident on the light guide plate 540.

The light source 520 may be one of a cold cathode fluorescent lamp (CCFL), a hot cathode fluorescent lamp (HCFL), an external electrode fluorescent lamp (EEFL), and a light emitting diode (LED), but is not limited thereto.

The optical sheet 530 may be positioned on the light guide plate 540. The optical sheet 530 can focus the light coming from the light source 520.

The optical sheet 530 shown in FIG. 5A may include a reflective polarizing film, a first adhesive layer on one surface of the reflective polarizing film, and a first diffusion layer on the first adhesive layer. The first adhesive layer may have a first thickness and a second thickness. The first diffusion layer may include a first light transmitting material and a plurality of first diffusion particles. Some first diffusion particles 252 may be embedded into the first transmitting material. And some first diffusion particles 253 may be exposed outside the first transmitting material.

At least one of the plurality of first diffusion particles may have a portion protruding above a surface of the first light transmitting material, and a height of the portion, h1, may substantially satisfy the following equation: $0.1D1 \leq h1 \leq 0.7D1$, where D1 is a diameter of the at least one of the plurality of first diffusion particles. The first thickness, T1, and the second thickness, T2, may substantially satisfy the following equation: $10\ nm \leq |T1-T2| \leq 2\ \mu m$.

The optical sheet 630 shown in FIG. 5B may further a reflective polarizing film, a first adhesive layer on one surface of the reflective polarizing film, a first diffusion layer on the first adhesive layer, a second adhesive layer on an other surface of the reflective polarizing film, and a second diffusion layer on the second adhesive layer. The first diffusion layer may include a first light transmitting material and a plurality of first diffusion particles. The second diffusion layer may include a second light transmitting material and a plurality of second diffusion particles. Some first diffusion particles and second diffusion particles may be embedded into the first transmitting material and the second transmitting material. Additionally, some first diffusion particles and second diffusion particles may be exposed outside the first transmitting material.

At least one of a diffusion sheet 532 and a prism sheet 531 may be positioned between the light guide plate 540 and the optical sheet 530, but are not limited thereto.

The liquid crystal display panel 610 may be positioned on the mold frame 570. The liquid crystal display panel 610 may be fixed by a top cover 620 which is fastened to the bottom cover 560 in a top-down manner.

The liquid crystal display panel 610 can display an image using light provided by the light source 520 of the backlight unit 510.

The liquid crystal display panel 610 may include a color filter substrate 612 and a thin film transistor substrate 614 that are opposite to each other with liquid crystals interposed between the color filter substrate 612 and the thin film transistor substrate 614.

The color filter substrate 612 can achieve colors of an image displayed on the liquid crystal display panel 610.

The color filter substrate 612 may include a color filter array of a thin film form on a substrate made of a transparent material such as glass or plastic. For example, the color filter substrate 612 may include red, green, and blue color filters. An upper polarizing plate may be positioned on the color filter substrate 612.

The thin film transistor substrate 614 is electrically connected to a printed circuit board 518, on which a plurality of circuit parts are mounted, through a drive film 516. The thin film transistor substrate 614 can apply a drive voltage provided by the printed circuit board 518 to the liquid crystals in response to a drive signal provided by the printed circuit board 518.

The thin film transistor substrate 614 may include a thin film transistor and a pixel electrode on another substrate made of a transparent material such as glass or plastic. A lower polarizing plate may be positioned under the thin film transistor substrate 614.

As described above, the optical sheet and the liquid crystal display including the optical sheet according to the exemplary embodiments of the invention can diffuse the light coming from the light source and improve the luminance uniformity by adjusting the height of the protruding portion of the diffusion particles in the diffusion layer and forming the adhesive layer having the curved surface between the reflective polarizing film and the diffusion layer.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. An optical sheet, comprising:
    a reflective polarizing film configured to transmit a portion of a light coming from a light source and to reflect another portion of the light coming from the light source;
    a first adhesive layer on one surface of the reflective polarizing film, a first portion of the first adhesive layer having a first thickness T1 measured along a vector substantially perpendicular to the one surface and a second portion of the first adhesive layer having a second thickness T2 substantially parallel to the first thickness, wherein a difference between the first and second thickness |T1−T2| is within a first predetermined range; and
    a first diffusion layer on the first adhesive layer, the first diffusion layer including a first light transmitting material and a plurality of first diffusion particles,
    wherein some of the plurality of first diffusion particles are embedded into the first light transmitting material and some of the plurality of first diffusion particles are exposed outside the first light transmitting material,
    wherein at least one of the first diffusion particles exposed outside the first light transmitting material has a portion protruding a predetermined height h1 above a surface of the first light transmitting material,
    wherein the first adhesive layer has a first surface and a second surface opposite the first surface, and the first diffusion layer has a first surface facing the second surface of the first adhesive layer, the optical sheet further comprising:

a second adhesive layer on another surface of the reflective polarizing film, a first portion of the second adhesive layer having a third thickness T3 measured along a vector substantially perpendicular to the another surface and a second portion of the second adhesive layer having a fourth thickness T4 substantially parallel to the third thickness, wherein a difference between the third and fourth thickness |T3−T4| is within a second predetermined range; and a second diffusion layer on the second adhesive layer, the second diffusion layer including a second light transmitting material and a plurality of second diffusion particles, wherein some of the plurality of second diffusion particles are embedded into the second light transmitting material and some of the plurality of second diffusion particles are exposed outside the second light transmitting material, wherein at least one of the second diffusion particles exposed outside the second light transmitting material has a portion protruding a predetermined height h2 above a surface of the second light transmitting material, wherein the second adhesive layer has a first surface and a second surface opposite the first surface, and the second diffusion layer has a first surface facing the second surface of the first adhesive layer, wherein the predetermined height h2 is a function of a diameter D2 of the second diffusion particle exposed outside the second light transmitting material, wherein the function is $0.1D2 \leq h2 \leq 0.7D2$, wherein the second predetermined range is $10 \text{ nm} \leq |T1-T2| \leq 2 \text{ μm}$, wherein the third thickness and the fourth thickness are substantially 1 μm to 10 μm, wherein a thickness of the first adhesive layer is larger than the difference between the first and second thickness |T1−T2|, and wherein a thickness of the second adhesive layer is larger than the difference between the first and second thickness |T3−T4|.

2. The optical sheet of claim 1, wherein the predetermined height h1 is a function of a diameter D1 of the first diffusion particle exposed outside the first light transmitting material.

3. The optical sheet of claim 2, wherein the function is $0.1D1 \leq h1 \leq 0.7D1$.

4. The optical sheet of claim 1, wherein the first predetermined range is $10 \text{ nm} \leq |T1-T2| \leq 2 \text{ μm}$.

5. The optical sheet of claim 1, wherein the first thickness and the second thickness are substantially 1 μm to 10 μm.

6. The optical sheet of claim 1, wherein the reflective polarizing film includes a first layer and a second layer, a refractive index of the first layer being different from a refractive index of the second layer.

7. The optical sheet of claim 1, wherein a thickness of the reflective polarizing film is substantially 100 μm to 300 μm.

8. The optical sheet of claim 1, wherein a thickness of the first adhesive layer is larger than a diameter of the first diffusion particle.

9. The optical sheet of claim 1, wherein a thickness of the second adhesive layer is larger than a diameter of the second diffusion particle.

10. The optical sheet of claim 1, wherein the first diffusion particles comprise a circle shape, an oval shape, a snowman/peanut shape, and an even circle shape.

11. A liquid crystal display, comprising:

a light source;

an optical sheet on the light source, the optical sheet including a reflective polarizing film;

a first adhesive layer on one surface of the reflective polarizing film, a first portion of the first adhesive layer having a first thickness T1 measured along a vector substantially perpendicular to the one surface and a second portion of the first adhesive layer having a second thickness T2 substantially parallel to the first thickness, wherein a difference between the first and second thickness |T1−T2| is within a first predetermined range; and a first diffusion layer on the first adhesive layer, the first diffusion layer including a first light transmitting material and a plurality of first diffusion particles, wherein some of the plurality of first diffusion particles are embedded into the first light transmitting material and some of the plurality of first diffusion particles are exposed outside the first light transmitting material, wherein at least one of the first diffusion particles exposed outside the first light transmitting material has a portion protruding a predetermined height h1 above a surface of the first light transmitting material, wherein the first adhesive layer has a first surface and a second surface opposite the first surface, and the first diffusion layer has a first surface facing the second surface of the first adhesive layer, the optical sheet further comprising:

a second adhesive layer on another surface of the reflective polarizing film, a first portion of the second adhesive layer having a third thickness T3 measured along a vector substantially perpendicular to the another surface and a second portion of the second adhesive layer having a fourth thickness T4 substantially parallel to the third thickness, wherein a difference between the third and fourth thickness |T3−T4| is within a second predetermined range; and a second diffusion layer on the second adhesive layer, the second diffusion layer including a second light transmitting material and a plurality of second diffusion particles, wherein some of the plurality of second diffusion particles are embedded into the second light transmitting material and some of the plurality of second diffusion particles are exposed outside the second light transmitting material, wherein at least one of the second diffusion particles exposed outside the second light transmitting material has a portion protruding a predetermined height h2 above a surface of the second light transmitting material, wherein the second adhesive layer has a first surface and a second surface opposite the first surface, and the second diffusion layer has a first surface facing the second surface of the first adhesive layer, wherein the predetermined height h2 is a function of a diameter D2 of the second diffusion particle exposed outside the second light transmitting material, and wherein the function is $0.1D2 \leq h2 \leq 0.7D2$, wherein the second predetermined range is $10 \text{ nm} \leq |T1-T2| \leq 2 \text{ μm}$, wherein the third thickness and the fourth thickness are substantially 1 μm to 10 μm, wherein a thickness of the first adhesive layer is larger than the difference between the first and second thickness |T1−T2|, and wherein a thickness of the second adhesive layer is larger than the difference between the first and second thickness |T3−T4|.

12. The liquid crystal display of claim 11, wherein the predetermined height h1 is a function of a diameter D1 of the first diffusion particle exposed outside the first light transmitting material, and wherein the function is 0.1D1≦h1≦0.7D1.

13. The liquid crystal display of claim 11, wherein the first predetermined range is 10 nm≦|T1−T2|≦2 μm.

14. The liquid crystal display of claim 11, wherein the reflective polarizing film includes a first layer and a second layer, a refractive index of the first layer being different from a refractive index of the second layer.

15. The liquid crystal display of claim 11, wherein a thickness of the reflective polarizing film is substantially 100 μm to 300 μm.

16. The liquid crystal display of claim 11, wherein a thickness of the first adhesive layer is larger than a diameter of the first diffusion particle.

17. The liquid crystal display of claim 11, wherein a thickness of the second adhesive layer is larger than a diameter of the second diffusion particle.

18. The liquid crystal display of claim 11, wherein the first diffusion particles comprise a circle shape, an oval shape, a snowman/peanut shape, and an even circle shape.

* * * * *